US006928160B2

(12) United States Patent
Ebenezer et al.

(10) Patent No.: US 6,928,160 B2
(45) Date of Patent: Aug. 9, 2005

(54) ESTIMATING BULK DELAY IN A TELEPHONE SYSTEM

(75) Inventors: Samuel Ponvarma Ebenezer, Tempe, AZ (US); Franklyn H. Story, Chandler, AZ (US)

(73) Assignee: Acoustic Technology, Inc., Mesa, AZ (US)

( * ) Notice: Subject to any disclaimer, the term of this patent is extended or adjusted under 35 U.S.C. 154(b) by 311 days.

(21) Appl. No.: 10/215,959

(22) Filed: Aug. 9, 2002

(65) Prior Publication Data

US 2004/0028217 A1 Feb. 12, 2004

(51) Int. Cl.[7] .............................................. H04B 3/23
(52) U.S. Cl. ............................... 379/406.06; 455/67.16
(58) Field of Search ......................... 379/406; 708/322, 708/301; 455/67

(56) References Cited

U.S. PATENT DOCUMENTS

| | | | |
|---|---|---|---|
| 4,582,963 A | | 4/1986 | Danstrom ................. 179/170.2 |
| 4,764,955 A | * | 8/1988 | Galand et al. ........... 379/406.1 |
| 6,078,567 A | | 6/2000 | Traill et al. ................. 370/289 |

OTHER PUBLICATIONS

IEEE publication 0–7803–6293–Apr. 2000 *Implementation and Evaluation of a Real–Time Line Echo Bulk–Delay Estimator*, Ramkumar and Tanrikulu, Apr., 2000; pp. 3650–3653.

*On the Estimation of Bulk–Delay and Length of Dispersive Region in Echo Cancellation*, Hau, Chan , and Liu; pp. 57–60.

* cited by examiner

Primary Examiner—Sinh Tran
Assistant Examiner—Daniel Swerdlow
(74) Attorney, Agent, or Firm—Paul F. Wille

(57) ABSTRACT

A bulk delay estimating circuit matches time intervals representing a signal with time intervals representing an echo of the signal to identify the echo and estimate bulk delay. Bulk delay is estimated by computing (1, 2, ... n) intervals representing the signal, computing (1, 2, ... n) intervals representing an echo of the signal, computing absolute differences between corresponding intervals to produce n absolute differences, summing the n absolute differences, and providing an output indicating whether or not the sum is less than a predetermined amount. The intervals are determined by defining a plurality of numbered frames, comparing the energy of a signal during each frame with at least one threshold, storing the numbers of the frames in which the threshold is exceeded, and defining an interval as the period from one frame in which the threshold is exceeded to the next frame in which the threshold is exceeded. Bulk delay is estimated from the frame numbers of the signal, its echo, and the duration of a frame.

16 Claims, 3 Drawing Sheets

ESTIMATING BULK DELAY IN A TELEPHONE SYSTEM

BACKGROUND OF THE INVENTION

This invention relates to echo cancellation in telephones and, in particular, to estimating bulk delay for adjusting an adaptive filter in echo cancelling circuitry. As used herein, "telephone" includes cellular telephones and land lines.

There are two kinds of echoes in telephones, an acoustic echo from the path between an earphone or a speaker and a microphone and a line echo generated in the switched network for routing a call between stations. Acoustic echo is typically not much of a problem in a wired telephone with a handset. For speaker phones and cell phones, acoustic feedback is much more of a problem. In a speaker phone, a room and its contents becomes part of the audio system and provide an acoustic path from speaker to microphone. In a cellular telephone, the enclosure provides an acoustic path from speaker to microphone.

There are several potential sources for line echoes. Hybrid devices (two-wire to four-wire converters) located at terminal exchanges or in remote subscriber stages of a fixed network are the principal sources of line echo. Apparatus for removing or minimizing echoes include echo suppressers, echo cancellers, and adaptive filters; see *Digital Signal Processing in Telecommunications* by Kishan Shenoi, Prentice-Hall, 1995, Chapter 6 (pages 334–385). "Suppression" is attenuation. Echo cancelling involves subtracting a local replica of the echo from the signal to eliminate an echo. The local replica is created by filtering the signal with an adaptive filter. The adaptive filter models either the near-end (speaker to microphone) or the far end (line out to line in) transfer function, which is assumed to be linear and time invariant; Shenoi, pg. 348. Unfortunately, the assumption is somewhat optimistic.

The impulse response of a typical echo path is shown in FIG. 1. This echo path is typically modeled by finite impulse response (FIR) filter. As seen in FIG. 1, the echo path has a bulk delay $t_{bd}$. This bulk delay is caused by the delays inherent in telephone networks, which can vary from network to network. For example, the bulk delay can vary from 100 ms to 500 ms. Hence, in order to cancel the network echo, one needs a long (many taps) adaptive filter. For example, to cancel a network echo with a bulk delay $t_{bd}$ of 448 ms and echo tail $t_d$ of 64 ms, see FIG. 1, one needs 4,096 taps in an FIR filter in a system with an 8 kHz sampling rate.

Long adaptive filters suffer from inherent problems, such as slow convergence rate and large residual echo, and from implementation issues such as the need for very high rates of executing instructions (MIPS—millions of instructions per second) and the need for large amounts of memory.

If one can estimate the bulk delay, then it is possible to cancel network echo with a short adaptive filter. This can be achieved by appropriate buffering of data samples. For example, in a system sampling at 8 kHz, to cancel network echo with a bulk delay of 448 ms and echo tail equal to 64 ms, only 512 taps are needed in an FIR filter if the bulk delay is known a priori. Thus, estimating bulk delay is essential for efficient network echo cancellation.

Most of the adaptive filters used in echo cancellers are implemented using least mean square (LMS) or fast affine projection algorithms. These algorithms are widely used in echo cancellers due to their computational simplicity, even though the performance of these algorithms is poor when compared with the high performance recursive least square (RLS) algorithm. Many bulk delay estimation methods are mentioned in the literature. Most of these bulk delay estimation methods are based on adaptive filters. These algorithms estimate the bulk delay by explicitly computing the impulse response of the echo path. Once the impulse response of the echo path is known, then the bulk delay can be calculated by finding the centroid of the impulse response. Specifically, if $h_e(n)$ is the impulse response of the echo path, then the bulk delay estimate is given by the following equation.

$$BD = \frac{T_s \sum n h_e^2(n)}{\sum h_e^2(n)} \quad n = 1, 2, \dots N$$

N is the order of the LMS filter The value of N is dependent upon maximum possible bulk delay and the echo tail. In particular, the value of N is directly proportional to the maximum possible bulk delay. If the value of N is high, the performance of the LMS filter degrades because the convergence time of the LMS filter is long and the residual error of the echo is high. The result is a poor estimate of the bulk delay. As noted above, there are also computational and memory problems due to the large number of taps used in an FIR implementation of an LMS filter. Therefore, LMS filters are not feasible when the bulk delay is long (e.g. greater than 100 ms.).

Due to these problems with the adaptive filters, other estimation methods were developed; e.g. U.S. Pat. No. 4,582,963 (Danstrom) and U.S. Pat. No. 6,078,567 (Traill et al.). The Danstrom patent discloses an edge detection method. Bulk delay is estimated by detecting an edge in the transmit direction and detecting an edge in the receive direction. Edge detection is performed by comparing the signal level with some threshold. Finally, the bulk delay estimate is obtained using the time difference between the transmit and receive detected edges.

A problem with this method is that most of the time the receive detected edge does not necessarily correspond to the transmit detected edge. The receive detected edge may correspond to far end speech (double talk condition) or noise or spikes. Under these conditions, there is a poor estimate of bulk delay. Moreover, this method requires that there be a period of quiet before the transmit edge is detected. The patent discloses that the duration of this quiet period should be equal to the maximum possible bulk delay. In many applications, the minimum bulk delay is at least 100 ms and closer to 500 ms. In a typical telephone conversation, it is rare to have such a long quiet time preceding near end speech. Hence, the bulk delay estimate obtained using this method is unreliable in most real-life telephone conversations.

The Traill et al. patent discloses a cross-correlation method. Theoretically, cross-correlation is the best method for measuring the similarity between any given set of signals. A problem with cross-correlation is that it is necessary to find the correlation between the two signals for all possible time delays in order to estimate the delay between the two signals. In particular, assuming that there are thirty-two samples, then it requires thirty-two multiplication and addition operations to perform the cross-correlation for a single time delay. There are thirty-one possible time delays, resulting in nine hundred ninety-two multiplication and addition operations. Thus, cross-correlation is computationally intensive and undesirable.

In view of the foregoing, it is therefore an object of the invention to provide an improved method and apparatus for estimating bulk delay.

Another object of the invention is to provide a method for estimating bulk delay that is not computationally intensive, i.e. does not require a high MIPS processor.

A further object of the invention is to provide a method for estimating bulk delay that does not require large amounts of memory.

Another object of the invention is to provide a method for estimating bulk delay that works well in noisy or in double-talk conditions.

A further object of the invention is to provide a method for estimating bulk delay that can be repeated during a telephone call, enabling the telephone to adapt to changing conditions during a call; e.g., cell phone handoffs.

SUMMARY OF THE INVENTION

The foregoing objects are achieved by this invention in which a bulk delay estimating circuit matches time intervals representing a signal with time intervals representing an echo of the signal to identify an echo and estimate bulk delay. Bulk delay is estimated by computing (1, 2, ... n) intervals representing the signal, computing (1, 2, ... n) intervals representing an echo of the signal, computing absolute differences between corresponding intervals to produce n absolute differences, summing the n absolute differences, and providing an output indicating whether or not the sum is less than a predetermined amount. The intervals are determined by defining a plurality of numbered frames, comparing the energy of a signal during each frame with at least one threshold, storing the numbers of the frames in which the threshold is exceeded, and defining an interval as the period from one frame in which the threshold is exceeded to the next frame in which the threshold is exceeded. Bulk delay is estimated from the frame numbers of the signal, its echo, and the duration of a frame.

BRIEF DESCRIPTION OF THE DRAWINGS

A more complete understanding of the invention can be obtained by considering the following detailed description in conjunction with the accompanying drawings, in which.

DETAILED DESCRIPTION OF THE INVENTION

Figure 1:
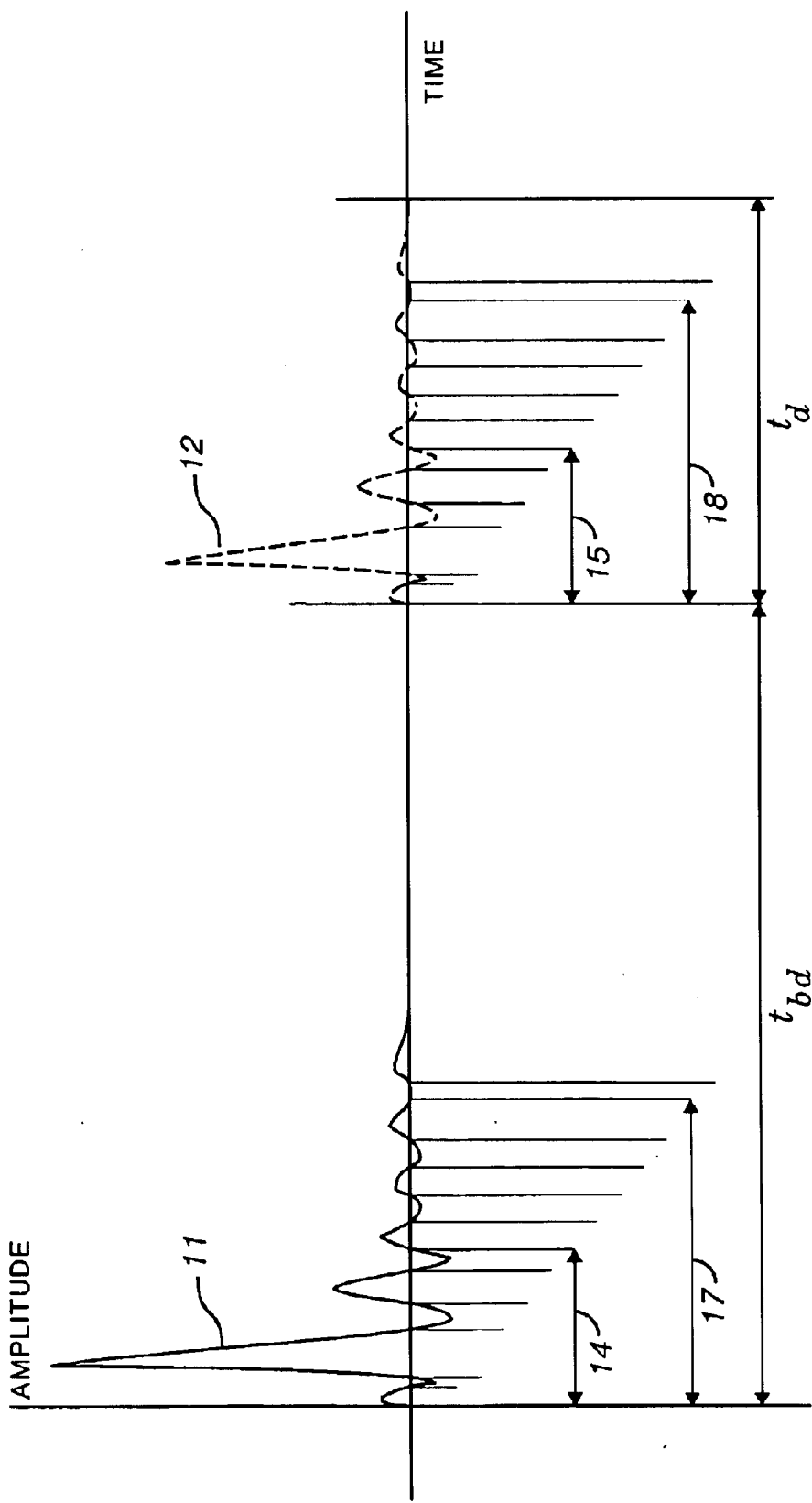
FIG. 1 is a graph illustrating bulk delay and other delays used for estimating bulk delay in accordance with the invention.

In FIG. 1, bulk delay $t_{bd}$ is the period beginning when impulse signal 11 enters a system, e.g. via the "line out" output from a telephone, and ending when echo signal 12 exits the system, e.g. via the "line in" input to a telephone. The echo tail $t_d$ is the duration of the echo signal. In accordance with the invention, and as illustrated in FIG. 1, a signal can be divided into a plurality of smaller intervals, such as intervals 14 and 17, e.g. according to certain moments in time, such as zero crossings. By correlating these intervals with the corresponding intervals in the echo signal, such as intervals 15 and 18, one can reliably identify the echo and estimate bulk delay. An analogy would be recognizing "di-di-di-dah" as the letter "V" in Morse code. The spacing of the sounds is matched with expected spacings to identify the letter. In the prior art, one would be looking for the tones di-di-di-dah to identify the beginning of Beethoven's Fifth Symphony; i.e. one is looking at the frequency content of the signal, not a plurality of delays.

In the following description, a "frame" refers to an arbitrary period of time or to a group of data taken during that period. In one embodiment of the invention, a frame is four milliseconds. Other periods could be used instead. FIG. 1 illustrates the invention in terms of zero crossings for ease of illustration. In accordance with one aspect of the invention, various thresholds are used rather than zero. One reason is that the time at which zero occurs is harder to detect than other signal levels. Another reason is that the input signal is preferably rectified before processing, which simplifies implementing the invention in integrated circuit form but eliminates zero crossings.

In accordance with the invention, estimating bulk delay begins by looking for a quiet period. A quiet period is at least one frame in which the energy level is below a first predetermined threshold. Power is approximated as the square of the amplitude of a sample. There are several samples per frame. Energy is the sum of the squares of the samples. For optimum performance, a quiet period should equal the longest anticipated delay, which can be 500 ms. or more. In one embodiment of the invention, a quiet period is thirty frames (120 ms.) in which the energy level is below a predetermined threshold. Sampling, squaring, and summing are individually well known operations in the art.

The second step in estimating bulk delay in accordance with the invention is to obtain data representing the pattern of intervals associated with a signal. Specifically, the energy of a frame is compared with a second threshold. If the energy is above the second threshold, then the frame number is stored. Similarly, the frame numbers of the next sixteen frames whose energy exceeds the second threshold are stored. (Not the numbers of the next sixteen frames but the frame numbers of the next sixteen frames whose energy exceeds the second threshold are stored). From the seventeen frame numbers, sixteen intervals are calculated. (Like lines and spaces on a soccer field. Eleven lines are needed to define ten spaces.)

Figure 2:
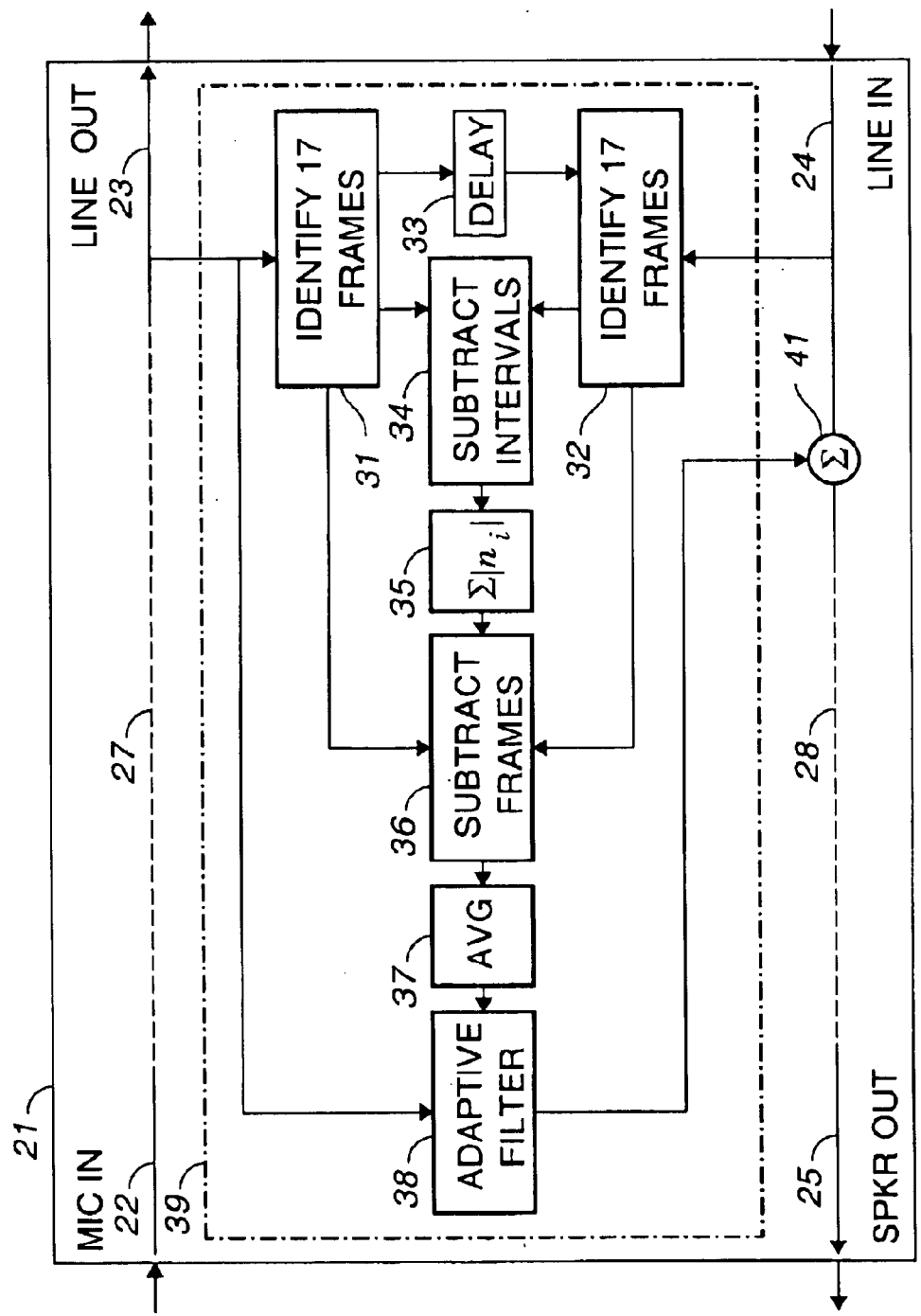
FIG. 2 is a block diagram of apparatus for estimating bulk delay in accordance with the invention.

In FIG. 2, telephone 21 includes a transmit channel, represented by microphone input 22, dashed line 27, and line output 23, and a receive channel, represented by line input 24, dashed line 28, and speaker output 25. A great deal of circuitry, represented by dashed lines 27 and 28, interconnects these inputs and outputs. Only the apparatus for estimating bulk delay and for cancelling line echo is illustrated in FIG. 2. A "line echo canceller" attempts to eliminate line echo. An "acoustic echo canceller" attempts to eliminate acoustic echo. An "adaptive echo canceller" is a generic term for either device.

Transmit block 31 calculates seventeen time stamps or sixteen intervals representing the signal on line output 23. Receive block 32 calculates sixteen intervals representing the signal on line input 24. The circuits within blocks 31 and 32 operate on different thresholds, which are adjusted in accordance with energy level of the transmitted signal, but are otherwise the same circuit. There are two thresholds in the receive block. These thresholds are dynamically set based on the energy levels of the seventeen detected transmit frames. Dynamically setting the thresholds is believed to reduce false echo detection due to far end speech.

Specifically, if the maximum energy among the seventeen detected transmit frames is $\alpha_{max}$ and the minimum energy among the seventeen detected transmit frames is $\alpha_{min}$, then the two thresholds in the receive block are set to $k_1\alpha_{max}$ and $k_2\alpha_{min}$, where $k_1$ and $k_2$ are constants based upon network modeling. In one embodiment of the invention $k_1$=0.18 and $k_2$=0.14, which assumes an echo is attenuated by 15 dB (gain=0.1778). Such dynamic setting implies that the transmit block and the receive block operate separately and consecutively, which is preferred.

Receive block 32 preferably starts comparing frame energy with two threshold levels after a predetermined delay from the leading edge of the transmit signal. The predetermined delay is approximately the minimum possible delay through the line network. A delay of 100 ms. has been found useful for cell phone PLMN networks but is not critical and depends upon application. Delay 33 obviates false detection due to far end speech (a signal on line input 24 not originating in telephone 21). Receive block 32 does not look for a quiet period but starts computing frame energies after a signal is received from delay 33. Delay 33 is preferably a timing circuit, not a delay line.

Block 34 subtracts the interval in one channel (e.g. $rxI_{(i)}$) from the corresponding interval in the other channel ($txI_{(i)}$). Block 35 sums the absolute differences between the sixteen intervals. (The differences may be positive or negative. The absolute value is taken because only magnitude is of interest, not sign.) Subtracting corresponding intervals and summing the absolute differences is computationally very fast and provides a quasi correlation of the intervals. A measure of bulk delay is considered valid if the sum of the absolute differences is less than a predetermined threshold.

If the sum of the absolute differences is less than the predetermined amount, then data representing estimated bulk delay is coupled to adaptive filter 38 within line echo canceller 39. Bulk delay is readily estimated from the seventeen frame numbers of the transmit signal, the seventeen frame numbers of the receive signal, and the size of each frame. One could use fewer frame numbers but using all is preferred. In block 36, the frame number of the leading edge of the signal is subtracted from the frame number of the leading edge of the echo. The difference is proportional to bulk delay and provides a first estimate. The next frame number of the signal is subtracted from the next frame number of the echo to produce a second estimate, and so on for seventeen estimates. The estimates are then averaged in block 37 to produce a more accurate estimate of bulk delay.

In a preferred embodiment of the invention, each estimate is divided by the number of frames, in this case seventeen, and the quotients are summed. Whether the estimates are summed first and then divided by the number of frames or divided first and then summed is of no consequence. The results are the same.

Adaptive filter 38 models the far end (line out to line in) transfer function using the estimate of bulk delay. Line echo canceller 39 filters the signal from line output 23 and couples the filtered signal to summation circuit 41, where it is combined with the signal from line input 24 to reduce line echo.

If the sum of the absolute differences is more than the threshold, the search is started over, beginning with the search for a quiet period. Similarly, if there are not sixteen additional intervals among the available frames, in the interval between the minimum possible bulk delay and the maximum possible bulk delay, then the system times out and starts over. In a system with 4 ms. frames, a minimum possible bulk delay of 100 ms. and a maximum possible bulk delay of 500 ms., there are one hundred available frames.

Figure 3:
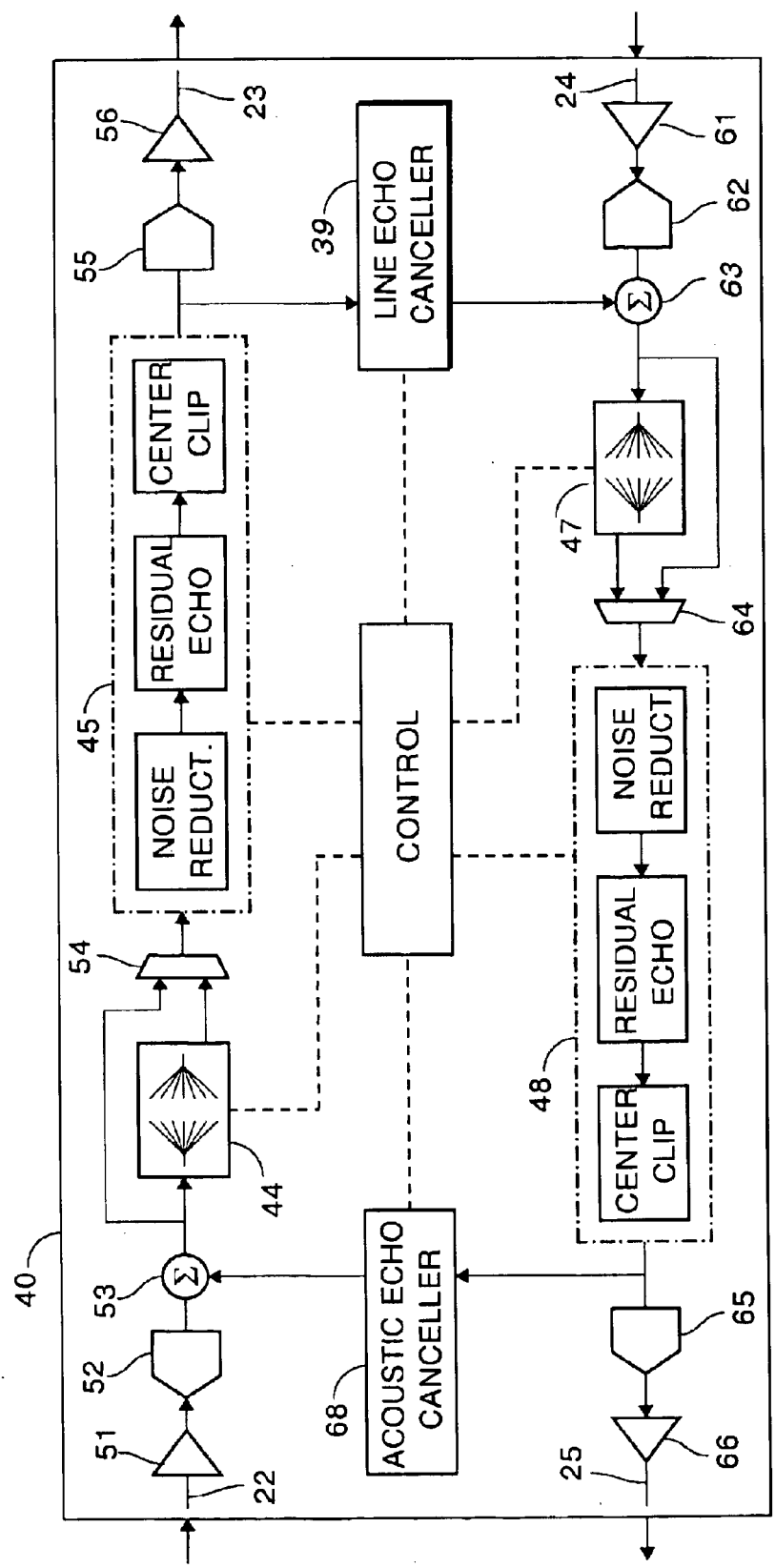
FIG. 3 is a block diagram of a telephone including echo cancellation using an adaptive filter programmed in accordance with a bulk delay estimated in accordance with the invention.

In FIG. 3, telephone 40 includes a complete echo cancelling system, of which adaptive echo cancelling is a part. Telephone 40 includes line echo canceller 39, shown in detail in FIG. 2, and acoustic echo canceller 41. The transmit channel includes a plurality of band pass filters in block 44 and non-linear processor 45. The receive channel includes a plurality of band pass filters in block 47 and non-linear processor 48. The symmetry of the apparatus does not mean that each channel operates identically, e.g. that the gain or threshold settings of corresponding components is the same. On the contrary, the signal on microphone input 22 is almost always different from the signal on line input 24 in spectral content and amplitude. The asymmetry in operation is part of what enables telephone 40 to be particularly effective in cancelling echoes.

Amplifier 51 is coupled to microphone input 22 and provides variable gain. Either programmable or automatic gain control can be used to optimize signal strength and range for analog to digital (A/D) converter 52. The output of converter 52 is coupled through summation circuit 53 to filter 44. The output from filter 44 is coupled through multiplex circuit 54 to non-linear processing (NLP) circuit 45, which includes a noise reduction circuit, a residual echo cancelling circuit, and a center clipper connected between multiplex circuit 51 and digital to analog (D/A) converter 55. Multiplex circuit 54 allows filter 44 to be by-passed under certain conditions. Amplifier 56 couples the output of D/A converter 55 to line output 23 and provides suitable impedance matching and signal levels for the line output.

Non-linear processing refers to the additional processing techniques that are applied to reduce residual echo signals after the application of adaptive cancellation. Traditionally, NLP techniques are employed only during single talk situations by increasing attenuation or suppression of residual echo and are inactive during double talk. More sophisticated controls have been applied that even allow for adaptive additional suppression during double talk. The most advanced techniques monitor the level of residual echo to determine if echo return loss estimates (ERLE) targets have been met. If excessive residual echo remains prohibiting meeting the ERLE goal, the NLP calculates and applies the correct level of additional suppression (on either the near end or far end or both sides of the call) to meet the specified ERLE.

Acoustic echo canceller 68 has an input coupled to the output of NLP circuit 48 and an output coupled to summation network 53. Acoustic echo canceller 68 includes a finite impulse response (FIR) filter, the coefficients of which are adjusted to model the acoustic echo path between speaker output 25 and microphone input 22.

The invention falls between the patented methods described above. Instead of correlating the signal levels, the apparatus matches time intervals. The candidates for time interval correlation are chosen by adaptive thresholds, which effectively reduce the false estimation due to double talk. The invention works well even in noisy condition due to the quasi time-interval correlation This quasi time interval correlation also effectively filters out all the wrong estimates that may occur due to noisy or double talk situation.

Averaging further filters out incorrect bulk delay estimates, resulting in a more accurate estimate of the bulk delay. Even though the computational cost in the invention may be slightly more than the one in the Danstrom patent, it is justified by its superior performance. When compared with the performance of the method disclosed in the Traill et al. patent, the invention may be slightly inferior but the cost of implementing quasi correlation in the invention is much lower than the cost of implementing the correlation system disclosed in the Traill et al. patent. Quasi-correlation merely involves sixteen subtractions and sixteen additions. Moreover an estimate of bulk delay in accordance with the invention is fairly accurate most of the time in single talk.

Having thus described the invention, it will be apparent to those of skill in the art that various modifications can be made within the scope of the invention. For example, FIG. 1 illustrates a plurality of intervals, such as intervals 14 and 17, having a common starting point. Preferably, the intervals are measured relatively, e.g. from the end of the preceding interval. The correlation can begin as soon as two intervals are available for comparison. There is no need to wait for all sixteen intervals. In fact, if it is clear after even just two or three intervals that the signals are not the same, the process can be restarted without waiting for sixteen intervals to be evaluated. This enables the bulk delay to be tracked accurately during a telephone call and provides much better echo cancelling than systems using but a single estimation for the duration of a call. Although the moments are defined in a preferred embodiment of the invention by frames and energy thresholds, other definitions can be used instead, e.g. slope (change in amplitude or energy vs. change in time) or rate of change of slope. (As used herein, "moment" is used in a temporal sense meaning a point in time, not in a mechanical sense of weighting or distance from an applied force to a point of attachment.) Instead of delay 33, one could ignore the first x frames of received signal, even if some had energies between the desired thresholds. Although estimating bulk delay can be continuous and the estimate changed several times during a single telephone call, one can postpone or terminate further estimation once an estimate is made during a telephone call.

What is claimed as the invention is:

1. In a telephone including an adaptive echo canceller having a finite impulse response filter and capable of cancelling echoes longer than filter length, the improvement comprising:

said finite impulse response filter having less than 1024 taps; and a bulk delay estimating circuit that matches time intervals representing a signal with time intervals representing an echo of the signal for programming said finite impulse response filter;

wherein the bulk delay estimating circuit includes:

a first input for an undelayed signal;

a first circuit for computing intervals in the undelayed signal;

a second input for receiving a delayed signal;

a second circuit for computing an equal number of intervals in the delayed signal;

a subtracting circuit coupled to said first circuit and to said second circuit, said subtracting circuit subtracting corresponding intervals from each circuit to produce a plurality of differences; and a summation circuit coupled to said difference circuit, said summation circuit accumulating a net difference and providing an output indicating whether or not the net difference is less than a predetermined amount.

2. The telephone as set forth in claim 1 wherein sixteen intervals are computed for each signal.

3. A method for estimating bulk delay of a signal, said method comprising the steps of:

computing intervals representing the signal;

computing an equal number of intervals representing an echo of the signal;

subtracting corresponding intervals to produce a plurality of differences;

adding the differences; and providing an output indicating whether or not the sum of the differences is less than a predetermined amount.

4. The method as set forth in claim 3 wherein each computing step includes the steps of:

defining a plurality of numbered frames;

comparing the energy of a signal during each frame with at least one threshold;

storing the numbers of the frames in which the threshold is exceeded; and defining an interval as the period from one frame in which the threshold is exceeded to the next frame in which the threshold is exceeded.

5. The method as set forth in claim 4 wherein said comparing step includes the steps of:

comparing the energy of a signal with a first threshold;

comparing the energy of a signal with a second threshold, wherein the second threshold is greater than the first threshold.

6. The method as set forth in claim 5 wherein said step of storing includes the step of identifying the frame in which the energy of a signal is between the first threshold and the second threshold, thereby substantially eliminating errors due to signals that are not echoes of the signal.

7. The method as set forth in claim 3 wherein the first computing step includes the steps of:

defining a plurality of numbered frames;

comparing the energy of the signal during each frame with a first threshold;

storing the numbers of the frames in which the first threshold is exceeded;

wherein an interval is the period from one frame in which the first threshold is exceeded to the next frame in which the first threshold is exceeded.

8. The method as set forth in claim 7 wherein the second computing step includes the steps of:

defining a second threshold as a function of the first threshold;

defining a plurality of numbered frames;

comparing the energy of an echo of the signal during each frame with the second threshold;

storing the numbers of the frames in which the second threshold is exceeded;

wherein an interval is the period from one frame in which the second threshold is exceeded to the next frame in which the second threshold is exceeded.

9. The method as set forth in claim 3 wherein the second computing step is delayed by a predetermined amount from the first computing step, thereby substantially eliminating errors due to signals that are not echoes of the signal.

10. The method as set forth in claim 3 wherein the computing steps are preceded by the step of looking for a quiet period in the signal.

11. A method for estimating bulk delay of a signal, said method comprising the steps of:
defining a plurality of numbered frames;
looking for a quiet period by
comparing the energy of the signal during each frame with a first threshold, and
finding a quiet period as a minimum number of consecutive frames in which the first threshold is not exceeded;
computing intervals representing the signal by
comparing the energy of the signal during each frame with a second threshold,
storing the numbers of the frames in which the second threshold is exceeded, and
defining an interval as the period from one frame in which the second threshold is exceeded to the next frame in which the second threshold is exceeded;
computing an equal number of intervals representing an echo of the signal by
setting a third threshold in proportion to the energy of the signal in one of the frames in which the second threshold was exceeded,
comparing the energy of the echo during each frame with the third threshold,
storing the numbers of the frames in which the third threshold is exceeded, and
defining an interval as the period from one frame in which the third threshold is exceeded to the next frame in which the third threshold is exceeded;
subtracting corresponding intervals to produce a plurality of differences; adding the differences; and
providing an output indicating whether or not the sum of the differences is less than a predetermined amount.

12. The method as set forth in claim 11 wherein said second computing step includes the steps of:
setting a third threshold in proportion to the minimum energy of the signal in one of the frames in which the second threshold was exceeded; and
setting a fourth threshold in proportion to the maximum energy of the signal in one of the frames in which the second threshold was exceeded.

13. The method as set forth in claim 12 wherein said second computing step includes the steps of:
comparing the energy of the echo with the third threshold;
comparing the energy of the echo with the fourth threshold.

14. The method as set forth in claim 13 wherein said second computing step includes the step of storing the numbers of the frames in which the energy of the echo is between the third threshold and the fourth threshold, thereby substantially eliminating errors due to signals that are not echoes of the signal.

15. The method as set forth in claim 11 wherein the second computing step is delayed by a predetermined amount from the first computing step, thereby substantially eliminating errors due to signals that are not echoes of the signal.

16. The method as set forth in claim 11 including the step of:
estimating bulk delay from the frame number of the first frame in which the energy of the signal exceeded the second threshold, the frame number of the first frame in which the energy of the echo exceeded the third threshold, and the duration of a frame.

* * * * *